Feb. 11, 1930.    V. B. SOUNITZA    1,746,616
OIL LEVEL MEASURING DEVICE FOR OIL WELLS
Filed July 23, 1927    2 Sheets-Sheet 1
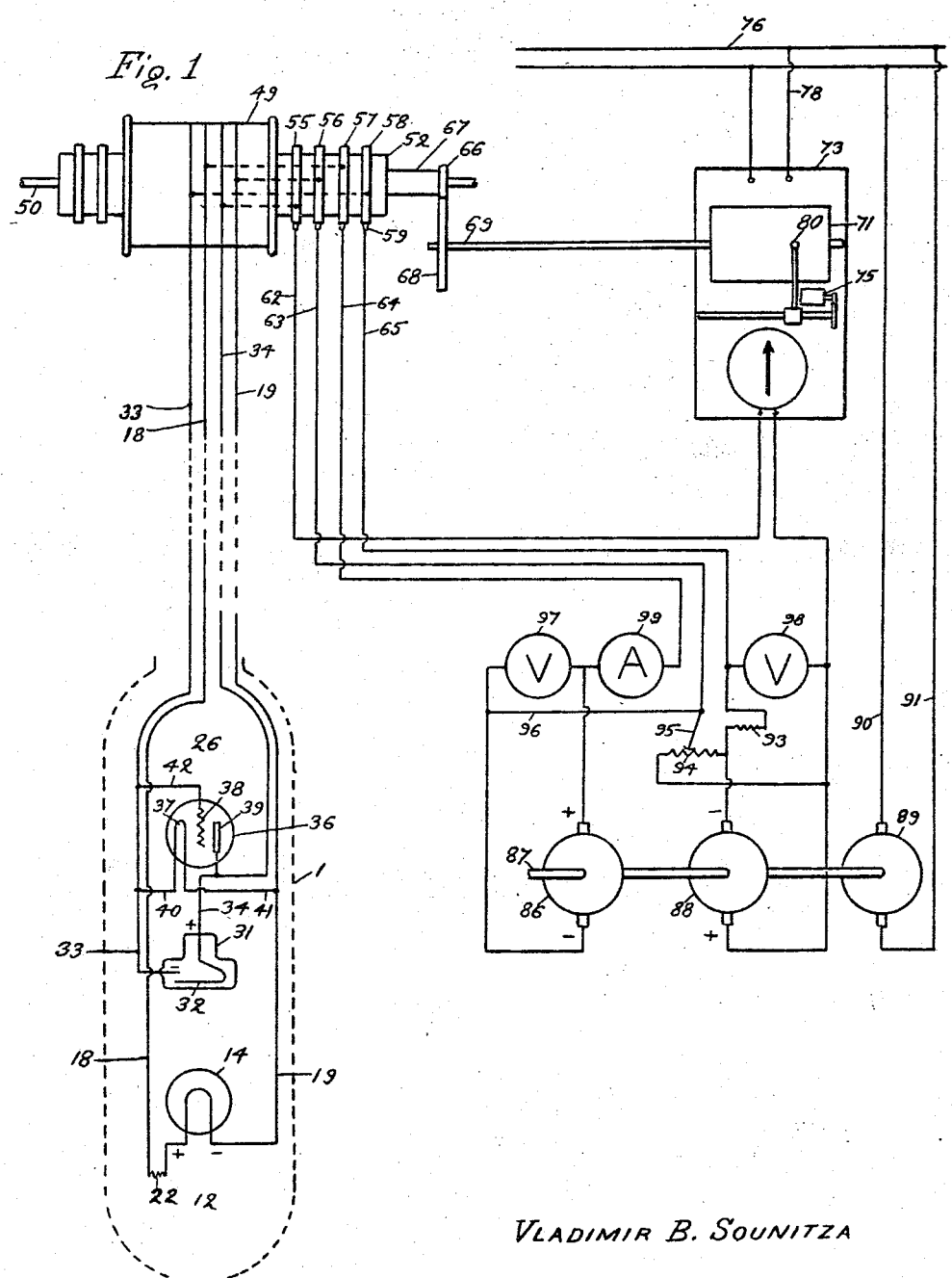
VLADIMIR B. SOUNITZA
INVENTOR
BY John P. Nikonow
ATTORNEY

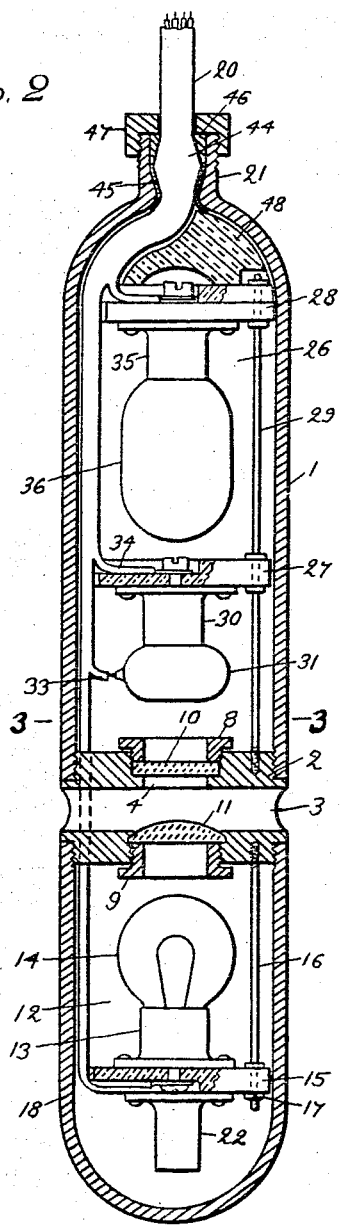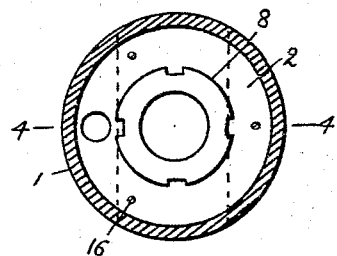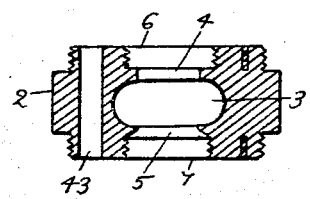

Patented Feb. 11, 1930

1,746,616

UNITED STATES PATENT OFFICE

VLADIMIR B. SOUNITZA, OF PASADENA, CALIFORNIA

OIL-LEVEL-MEASURING DEVICE FOR OIL WELLS

Application filed July 23, 1927. Serial No. 208,024.

My invention relates to oil indicating devices and has a particular reference to electrical indicating and recording instruments for measuring the height of the oil level in oil wells.

The object of my invention is to provide such an instrument of a portable construction which can be lowered into an oil well and which will automatically register the depth at which the oil occurs. The same instrument can be also used for locating the salt water in the well and for determination of its degree of salinity.

For this purpose I employ an enclosed metal cylinder with an electric lamp inside and a photoelectric element, separated by a glass container open to the outside. The presence of oil in the container produces a change in the illumination which is indicated by electrical instruments outside of the well.

One of the walls of the above mentioned glass container may be made of a polarizing material in which case my device can be also used for determination of the salinity of water in the well.

My invention is more fully described in the accompanying specification and drawings in which—

Fig. 1 is a diagrammatic view of my device with electrical connections, Fig. 2 is a sectional elevation of the device itself, Fig. 3 is a sectional view taken on a section 3—3, Fig. 2, Fig. 4 is a sectional view of a middle member containing the oil chamber.

My device consists of a cylindrical container or tube 1, preferably made of a noncorrosive metal, enclosed on both ends. It consists of two portions screwed together in the middle by means of a threaded block 2. This block has a transverse aperture 3 extending from one side to the other. Two circular apertures, 4 and 5, connect the aperture 3 with the inside of the tube 1.

The apertures 4 and 5 have circular recesses 6 and 7 which are threaded inside to fit threads of tubular clamping plugs 8 and 9. The plug 8 clamps a plate 10 made of a transparent material such as glass. The plug 9 clamps a plate 11 also made of a transparent material. This plate is made of a convex shape on top as shown in order to prevent any accumulation of oil or water on its surface.

The transparent plates, or one of them, may be made of a polarizing material, such as tourmaline, Iceland spar, etc., for determination of the amount of salt in water when there is water instead of oil in the well.

In the lower chamber 12 of the test tube 1 a socket 13 for an electric lamp 14 is mounted on an insulating plate 15. This plate may be supported from the central block 2 by means of three studs 16 with nuts 17. The wires 18 and 19 from the lamp extend in a common cable 20 with other wires through a nipple 21 on top of the tube 1. A voltage regulating resistance 22 is inserted in the wire 18.

In the upper chamber 26 plates 27 and 28, made of an insulating material, are supported on studs 29 as shown in Fig. 2. The plate 27 supports a socket 30 for a photoelectric element or tube 31. The cathode 32 is placed so that it can receive the light rays from the lamp 14 through glass plates 10 and 11. The wires or leads 33 and 34 extend from the element 31 through the top of the tube 1 in the cable 20.

The plate 28 supports a socket 35 for an amplifier tube 36, containing a filament 37, grid 38 and plate 39 with outside leads 40, 41 and 42.

The block 2 has an aperture 43 for the leads. The cable 20 has an enlargement 44 tapering from both ends and made of an insulation, for instance, by molding a rubber tube. This enlargement is clamped inside of the nipple 21 against conical sides of the central aperture with a layer of insulation 45. A loose cone 46 is placed on top of the enlarged portion and is clamped with a tubular clamping nut 47. This construction provides an air tight clamping gland for the cable 20.

A filling block 48 is placed on top of the plate 28 in order to hold the inner portion of the cable firmly in its position. This block is made of a suitable insulating material.

The leads 40 and 42 are connected with a lead 33, lead 41 is connected with the lead 19, and the plate of the amplifier is connected with the lead 34. Altogether there are six leads or wires in the cable 20.

The other end of the cable is attached to a drum 49 rotatively mounted on a shaft 50. This drum has a suitable attachment (not shown) for turning it either by hand or by an electric (or other) power. The drum has extension 52 insulated on the outside and provided with collector rings 55, 56, 57 and 58. By means of contact brushes 59 these rings are connected with leads 62, 63, 64 and 65. A pinion 66 is mounted on an additional extension 67 of the drum 49 and is in mesh with a gear 68 on a shaft 69. This shaft supports cylinder 71 with charts of recording galvanometer or milliammeter 73.

This instrument may be of any suitable construction. It is shown with separate electric motor 75 operated from an independent circuit 76 with which it is connected by wire 78. This motor operates a writing point 80 through suitable mechanical connections and is controlled by contacts operated by movable coils of the instrument.

A generator 86 is mounted on a common shaft 87 with a second generator 88 and a motor 89. The latter is connected with the electric circuit 76 by means of wires 90 and 91. The negative terminal of the generator 86 is connected with the lead 14 through leads 96, 63, ring 56 and lead 19.

The milliammeter 73 is connected in series with the positive lead 62 from the generator 88 and through the ring 55 with the lead 34 of the cable 20.

The negative lead from the generator 88 is provided with a voltage regulating element 93 and is connected with a lead 65, ring 58 and lead 33 of the cable 20.

The generator 88 develops higher voltage than generator 86 and is provided with a voltage compensating resistance 94 with a movable contact handle 95 connected with the negative terminal of the generator 86 by means of a lead 96.

Voltmeters 97 and 98 are connected in the circuits of the generators 86 and 88, and an ammeter 99 is connected in series with the lamp and filament of the amplifier.

The operation of my device is as follows:

The drum 49, with the cable 20 fully wound, is placed at the top of the well together with the switchboard with instruments and the motor generator set. The motor is connected with the power circuit, also the power terminals of the recording meters (if they require such power circuit).

The testing tube 1 is then gradually lowered into the well by unwinding the cable from the drum. The depth at which the tube is being lowered is recorded on the charts of the meters 72 and 73.

As long as the tube is in the air, the photoelectric tube 31 receives the full intensity of the light from the lamp 14, and the pen 80 of the milliammeter 73 draws a straight line on the chart. But as soon as the tube becomes immersed in oil, its low transparency will greatly reduce the illumination of the photo tube, and the pen 80 will step down on the chart, indicating the exact point of the oil level.

If there is water under the oil in the well, then this water will be also recorded as its transparency is different from the transparencies of oil and air. The polarizing crystal in the block 2 will reduce the illumination still further and in proportion to the amount of salt in water. The record on the chart will show different degrees of salinity of water at different levels. By this method it is possible to determine the exact point at which water enters the well and where, therefore, a cemented casing should be used.

Important advantages of my device are that it can easily and accurately give a complete record of the internal conditions in the oil well, the depth of the oil and water levels, and the amount of salt in water at different levels.

The device can be easily transported from one well to the other (for instance, on a truck) and can be manipulated by one man.

I claim as my invention:

In an oil level measuring device for oil wells, the combination with an electric lamp, of a photoelectric element, an oil proof tubular container for said lamp and said element, a separating member between said lamp and said element, said member being provided with a transverse aperture extending from one side of said container to the other, transparent plates in said wall between said lamp and said element adapted to admit the light from said lamp to said element through said aperture, electric leads extending from said lamp and said element to the outside of said container and adapted to support said container in an oil well, electric measuring instruments connected with said leads, a source of electric current for said instruments, said lamp and said element, said transparent plates being made of a polarizing material and adapted to offer different electrical resistance to the electric current depending on the chemical composition of the medium entering said aperture from said oil well.

Signed at New York, in the county of New York and State of New York, this 22d day of July, A. D. 1927.

VLADIMIR B. SOUNITZA.